United States Patent
Venkatachalam et al.

(10) Patent No.: US 8,755,408 B2
(45) Date of Patent: Jun. 17, 2014

(54) METHOD AND APPARATUS FOR MAC MESSAGE RELIABILITY

(75) Inventors: Muthaiah Venkatachalam, Beaverton, OR (US); Xiangying Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 12/766,544

(22) Filed: Apr. 23, 2010

(65) Prior Publication Data

US 2010/0275085 A1 Oct. 28, 2010

Related U.S. Application Data

(60) Provisional application No. 61/173,204, filed on Apr. 28, 2009.

(51) Int. Cl.
*G08C 25/02* (2006.01)

(52) U.S. Cl.
USPC ............................ 370/474; 714/748; 370/394

(58) Field of Classification Search
USPC ............ 370/329, 394, 395.54, 470, 471, 472, 370/473, 474, 203, 208–210, 335; 714/748, 714/749, 751, 752
See application file for complete search history.

(56) References Cited

U.S. PATENT DOCUMENTS

| | | | |
|---|---|---|---|
| 6,557,134 B2 * | 4/2003 | Bims et al. ................... | 714/748 |
| 7,058,085 B2 * | 6/2006 | Earnshaw et al. ............. | 370/473 |
| 7,161,909 B2 * | 1/2007 | Sharma ......................... | 370/235 |
| 7,564,831 B2 * | 7/2009 | Ihm et al. ...................... | 370/349 |
| 8,051,353 B2 * | 11/2011 | Maas et al. .................... | 714/748 |
| 8,300,663 B2 * | 10/2012 | Chion et al. .................. | 370/474 |
| 2005/0008035 A1 | 1/2005 | Eklund et al. | |
| 2005/0050217 A1 | 3/2005 | Tamura | |
| 2008/0109693 A1 * | 5/2008 | Maas et al. .................... | 714/748 |
| 2009/0086659 A1 | 4/2009 | Pani et al. | |

FOREIGN PATENT DOCUMENTS

| | | |
|---|---|---|
| JP | 1146217 A | 6/1989 |
| JP | 9116597 A | 5/1997 |
| JP | 1132077 A | 2/1999 |
| JP | 11215192 A | 8/1999 |
| JP | 2002135231 A | 5/2002 |
| JP | 2002532000 A | 9/2002 |
| JP | 2005500761 A | 1/2005 |
| JP | 2007509531 A | 4/2007 |
| JP | 2007221795 A | 8/2007 |
| JP | 2008172754 A | 7/2008 |

(Continued)

OTHER PUBLICATIONS

"IEEE P802.16m/D4—Part 16: Air Interface for Fixed and Mobile Broadband Wireless Access Systems", IEEE P802.16m/D4, (Feb. 2010), 1-30, 37-60, 146-156, 226-228, and 267-290.

(Continued)

*Primary Examiner* — Hanh N Nguyen
(74) *Attorney, Agent, or Firm* — Schwegman, Lundberg & Woessner, P.A.

(57) ABSTRACT

Embodiments of a system and method for wireless communication are provided. In certain embodiments, a plurality of fragments of a MAC management message is transmitted. Each fragment includes a sequence number indicating an order of the fragments, and at least one of the fragments includes a transaction ID identifying the MAC management message with respect to other messages.

14 Claims, 6 Drawing Sheets

(56) References Cited

FOREIGN PATENT DOCUMENTS

| JP | 2008278014 | A | 11/2008 |
|---|---|---|---|
| JP | 2005072664 | A | 3/2013 |
| KR | 20010023491 | A | 3/2001 |
| KR | 20010023491 | | 11/2002 |
| KR | 100668680 | B1 | 1/2007 |
| WO | WO-03043259 | A1 | 5/2003 |
| WO | WO-2010129366 | A2 | 11/2010 |
| WO | WO-2010129366 | A3 | 2/2011 |

OTHER PUBLICATIONS

"International Application Serial No. PCT/US2010/032839, Search Report mailed Dec. 14, 2010", 3 pgs.
"International Application Serial No. PCT/US2010/032839, Written Opinion mailed Dec. 14, 2010", 4 pgs.
"International Application Serial No. PCT/US2010/032839, International Preliminary Report on Patentability mailed Nov. 10, 2011", 6 pgs.
"European Application Serial No. 10772586.3, Extended European Search Report mailed Jan. 3, 2013", 6 pgs.
"Japanese Application Serial No. 2012-508659, Office Action mailed Mar. 12, 2013", 4 pgs.
"Korean Application Serial No. 20117028195, Preliminary Rejection mailed Nov. 29, 2012", 7 pgs.
Eklund, et al., "A technical overview of the WirelessMAN tm air interface for broadband wireless access", vol. 40, No. 6, (Jun. 1, 2002), 98-107.
IEEE Standards Association, "IEEE Standard for Local and metropolitan area networks, Part 16: Air Interface for Fixed Broadband Wireless Access Systems", IEEE Std 802.16-2004, (Oct. 1, 2004).
"European Application Serial No. 10772586.3, Amendment filed Aug. 1, 2013", 16 pgs.
"European Application Serial No. 10772586.3, Amendment filed Nov. 10, 2011", 4 pgs.
"Japanese Application Serial No. 2012-508659, Office Action mailed Oct. 8, 2013", w/English translation, 4 pgs.
"Japanese Application Serial No. 2012-508659, Response filed Jun. 10, 2013 to Office Action mailed Mar. 12, 2013", w/ English claims, 14 pgs.
"Korean Application Serial No. 20117028195, Response filed Mar. 28, 2013 to Office Action mailed Nov. 29, 2012", English claims, 5 pgs.
"Taiwanese Application Serial No. 099113312, Office Action mailed Jun. 20, 2013", w/English translation, 10 pgs.
"Evolved Universal Terrestrial Radio Access (E-UTRA); Medium Access Control (MAC) protocol specification", 3GPP TS 36.321 V8.5.0, [Online]. Retrieved from the Internet: <URL: http://www.qtc.jp/3GPP/Specs/36321-850.pdf>, (Mar. 23, 2009), 46 pgs.
"Evolved Universal Terrestrial Radio Access (E-UTRA); Multiplexing and channel coding", 3GPP TS 36.212 V8.6.0, [Online]. Retrieved from the Internet: <URL: http://www.etsi.org/deliver/etsi_ts/136200_136299/136212/08.06.00_60/ts_136212v080600p.pdf>, (Mar. 17, 2009), 59 pgs.
Taiwanese Application Serial No. 099113312, Office Action mailed Mar. 28, 2014, w/English Translation, 18 pgs.

\* cited by examiner

METHOD AND APPARATUS FOR MAC MESSAGE RELIABILITY

This application claims the benefit of priority under 35 U.S.C. 119(e) to U.S. Application Ser. No. 61/173,204, filed on Apr. 28, 2009, which is incorporated herein by reference in its entirety.

BACKGROUND

Media access control (MAC) layer management message reliability is an important issue for wireless network operations. Typically a wireless system requires MAC management message error rate of 10 to the minus six of less. This error rate requirement is typically more stringent than the requirement for data packets.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In an example, the reliability MAC management messages can be improved by splitting a MAC management message into fragments and transmitting the individual fragments. In an example, MAC management message reliability is improved by implementing a light version of automatic repeat request (ARQ).

Figure 1:
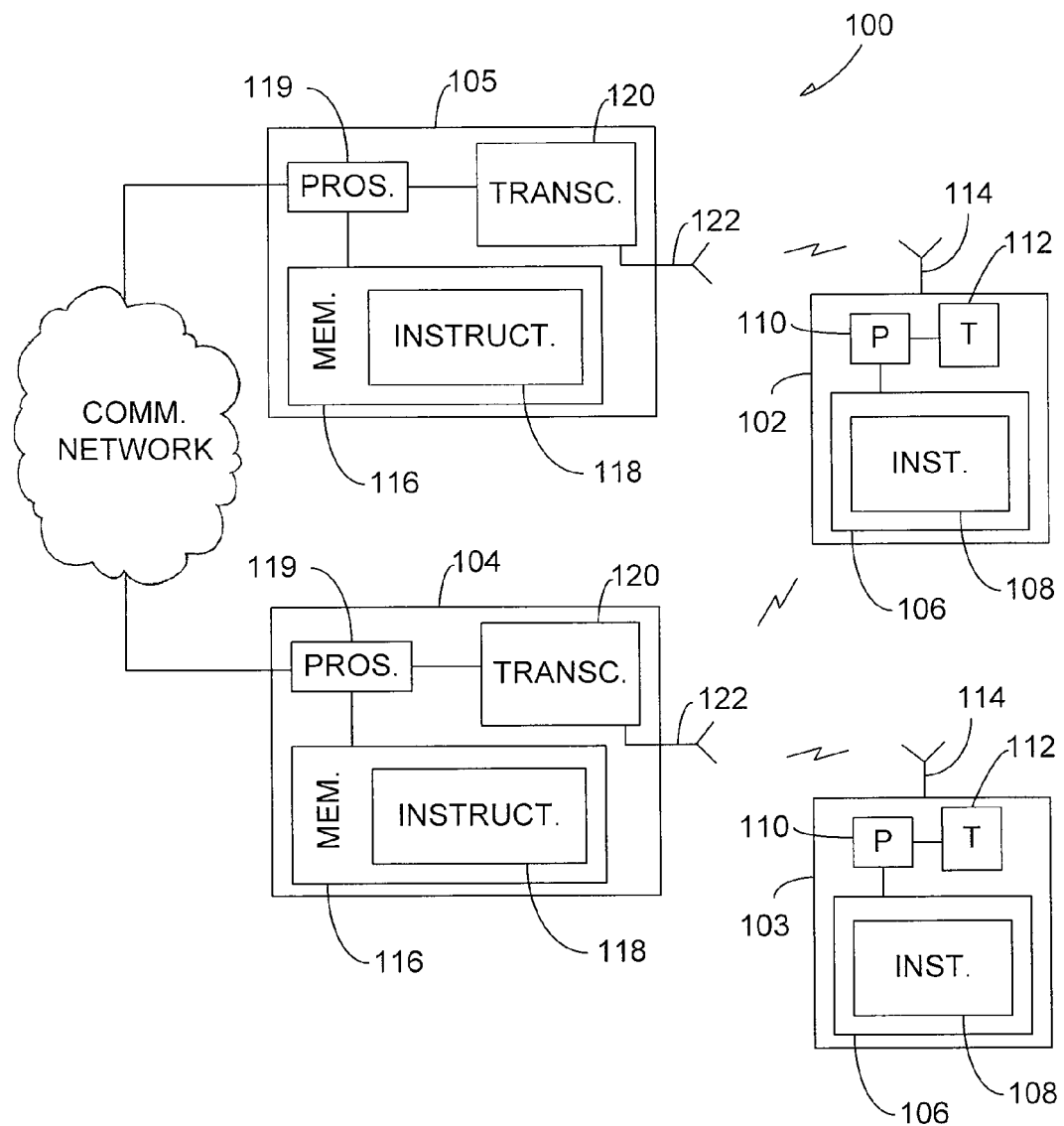
FIG. 1 illustrates an example of a wireless communication system.

FIG. 1 illustrates an example of a wireless communication system 100. The wireless communication system 100 can include a plurality of mobile stations 102, 103 in wireless communication with one or more base stations 104, 105. Each mobile station 102, 103 can include a memory 106 for storage of instructions 108 for execution on processing circuitry 110 of the mobile stations 102, 103. The instructions 108 can comprise software configured to cause the mobile stations 102, 103 to perform actions for wireless communication between the mobile stations 102, 103 and the base stations 104, 105. Each mobile station 102, 103 can also include an RF transceiver 112 for transmission and reception of signals coupled to an antenna 114 for radiation and sensing of signals.

In an example, the mobile stations 102, 103 can be configured to operate in accordance with one or more frequency bands and/or standards profiles including a Worldwide Interoperability for Microwave Access (WiMAX) standards profile, a WCDMA standards profile, a 3G HSPA standards profile, and a Long Term Evolution (LTE) standards profile. In some examples, the mobile stations 102, 103 can be configured to communicate in accordance with specific communication standards, such as the Institute of Electrical and Electronics Engineers (IEEE) standards. In particular, the mobile stations 102, 103 can be configured to operate in accordance with one or more versions of the IEEE 802.16 communication standard (also referred to herein as the "802.16 standard") for wireless metropolitan area networks (WMANs) including variations and evolutions thereof For example, the mobile stations 102, 103 can be configured to communicate using the IEEE 802.16-2004, the IEEE 802.16 (e), and/or the 802.16(m) versions of the 802.16 standard. In some examples, the mobile stations 102, 103 can be configured to communicate in accordance with one or more versions of the Universal Terrestrial Radio Access Network (UTRAN) Long Term Evolution (LTE) communication standards, including LTE release 8, LTE release 9, and future releases. For more information with respect to the IEEE 802.16 standards, please refer to "IEEE Standards for Information Technology—Telecommunications and Information Exchange between Systems"—Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and later versions (releases) thereof.

In some examples, RF transceiver 112 can be configured to communicate orthogonal frequency division multiplexed (OFDM) communication signals which comprise a plurality of orthogonal subcarriers. In some of these multicarrier examples, the mobile stations 102, 103 can be a broadband wireless access (BWA) network communication station, such as a Worldwide Interoperability for Microwave Access (WiMAX) communication station. In other broadband multicarrier examples, the mobile stations 102, 103 can be a 3rd Generation Partnership Project (3GPP) Universal Terrestrial Radio Access Network (UTRAN) Long-Term-Evolution (LTE) communication station. In these broadband multicarrier examples, the mobile stations 102, 103 can be configured to communicate in accordance with an orthogonal frequency division multiple access (OFDMA) technique.

In other examples, the mobile stations 102, 103 can be configured to communicate using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation.

In some examples, the mobile stations 102, 103 can be a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that can receive and/or transmit information wirelessly.

In an example, the base stations 104, 105 can include a memory 116 for storage of instructions 118 for execution on processing circuitry 119 of the base stations 104, 105. The instructions 118 can comprise software configured to cause the base stations 104, 105 to perform actions for wireless communication with the plurality of mobile stations 102, 103 and for communication with another communication network 124 (e.g. a plain old telephone service (POTS) network). The base stations 104, 105 can also include an RF transceiver 120 for transmission to and from the mobile stations 102, 103 and an antenna 122 communicatively coupled to the RF transceiver 120. In certain examples, the RF transceiver 120 and the antenna 122 can be housed in the same location as the memory 116 and the processing circuitry 119, and in other examples, the RF transceiver 120 (or portions thereof) and/or antenna 122 can be located remotely from the memory 116 and the processing circuitry 119, such as in a distributed base station.

In some examples, the RF transceiver 120 can be configured to communicate OFDM communication signals which comprise a plurality of orthogonal subcarriers, and, in particular, an OFDMA technique. In other examples, the RF transceiver 120 can be configured to communicate using one or more other modulation techniques such as spread spectrum modulation (e.g., DS-CDMA and/or FH-CDMA), TDM modulation, and/or FDM modulation.

In an example, the base stations 104, 105 can be configured to operate in accordance with one or more frequency bands/carriers and/or standards profiles including a WiMAX standards profile, a WCDMA standards profile, a 3G HSPA standards profile, and an LTE standards profile. In some examples, the base stations 104, 105 can be configured to communicate in accordance with specific communication standards, such as the IEEE standards. In particular, the base stations 104, 105 can be configured to operate in accordance with one or more versions of the 802.16 including variations and evolutions thereof. For example, the base stations 104, 105 can be configured to communicate using the IEEE 802.16-2004, the IEEE 802.16(e), and/or the 802.16(m) versions of the 802.16 standard. In some examples, the base stations 104, 105 can be configured to communicate in accordance with one or more versions of the UTRAN LTE communication standards, including LTE release 8 and LTE release 9.

In an example, the wireless communication system 100 can use one or more data/traffic/transport connections and one or more control/signaling connections as defined by the communication standard. The data/traffic/transport connections can carry user data, while the control/signaling connections can primarily carry control data (e.g., signaling data).

Figure 2:
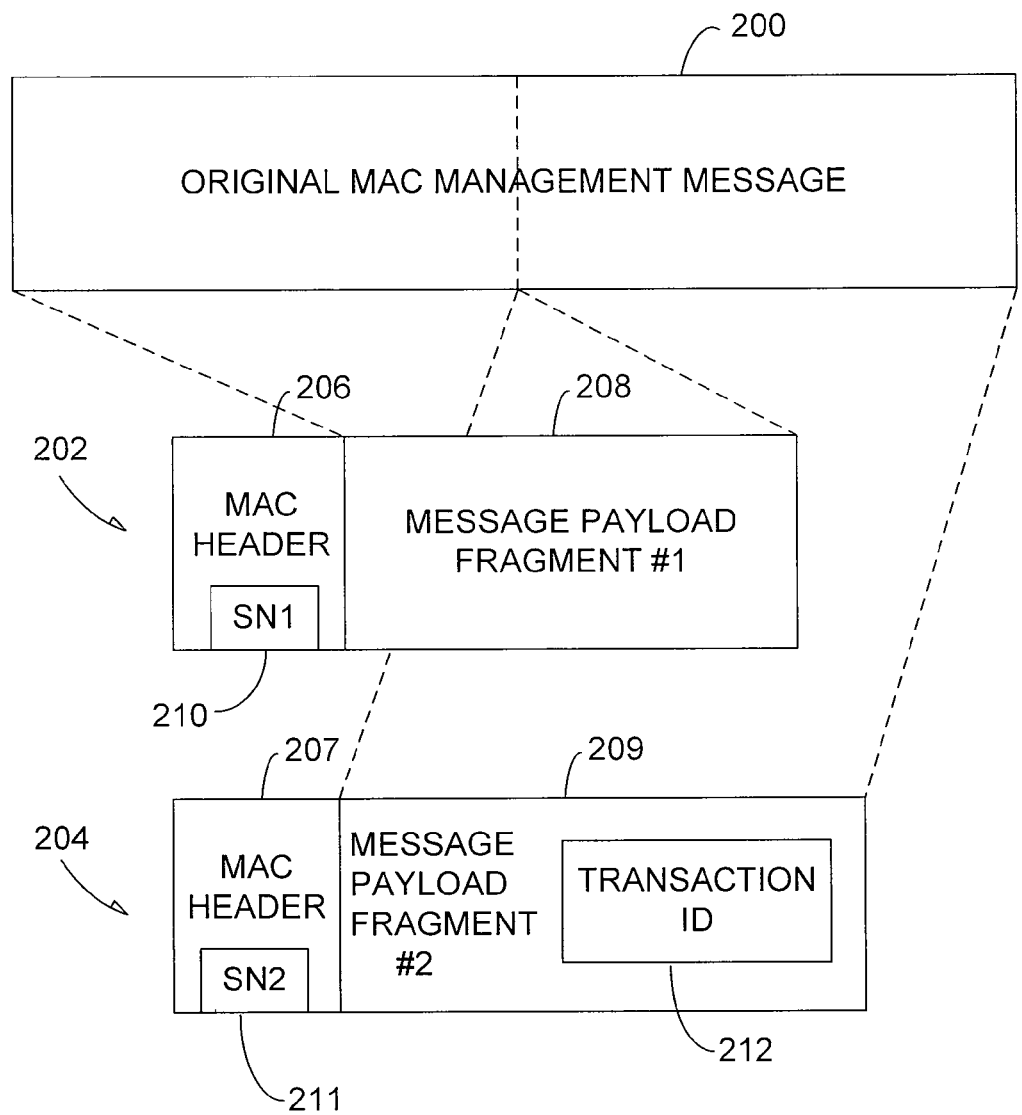
FIG. 2 illustrates an example of a MAC management message divided into a first fragment and a second fragment.

FIG. 2 illustrates an example of a MAC management message 200 divided into a first fragment 202 and a second fragment 204. In an example, the MAC management message 200 includes a message to support configuration and coordination functions of the base stations 104, 105 and the mobile stations 102, 103. In an example, the MAC management message 200 includes a control message transported over a control/signaling connection. In an example, the MAC management message 200 includes a unicast MAC control message. Examples of MAC management messages 200 (also referred to as "MAC control messages") are listed in Table 675 of the IEEE 802.16(m) D4 version of the 802.16 standard. Although the MAC management message 200 is shown as divided into two fragments, in other examples, the MAC management message 200 can be divided into three or more fragments.

In an example, each fragment 202, 204 can be transmitted on a different HARQ control (e.g., ACID) channel, and each fragment 202, 204 can be transmitted in a different physical layer burst. In other examples, some fragments are transmitted on the same HARQ control channel and some fragments are transmitted within the same physical layer burst. Accordingly, the fragments 202, 204 can be transmitted asynchronously and can arrive at the receiving device in a different order than the order in which they consist in the MAC management message 200. To enable the receiving device to put the fragments in the correct when reconstructing the MAC management message 200 each fragment can include a sequence number 210, 211 indicating the order of the fragment relative to the other fragments of the MAC management message 200. In an example, the sequence number 210, 211 can be located in a MAC header portion 206, 207 of the fragment 202, 204. Along with the MAC header portion 206, 207, each fragment 202, 204 can include a MAC payload portion 208, 209.

In an example, first fragment 202 is the first-in-order fragment (e.g., the fragment comprising the beginning of the MAC management message 200). Accordingly, the sequence number 210 for the first fragment 202 corresponds to the first-in-order portion of the MAC management message 200. Likewise, the sequence number 211 for the second fragment 204 corresponds to the second-in-order portion of the MAC management message 200. That is, the sequence numbers 210, 211 indicate that the first fragment 202 is ahead of and adjacent to the second fragment 204. In an example, the sequence numbers incrementally count upwards. Example numbers to indicate that the first fragment 202 is ahead of and adjacent to the second fragment 204 include 024 for the sequence number 210 and 025 for sequence number 211. In an example, the sequence numbers 210, 211 are 8 bits in length such that a total of 64 fragments per MAC management message 200 are allowed. In an example, the sequence numbers are assigned on a per-message basis. That is, the sequence numbers indicate an order with respect to other fragments within a message, but do not provide order information with respect to fragments of other messages.

In an example, at least one fragment of the MAC management message 200 includes a transaction ID 212. The transaction ID 212 can be used to identify the MAC management message 200 with respect to other messages. For example, different MAC management messages 200 can have a different transaction ID 212. In an example, the transaction ID 212 is implemented with an incremental counter such that consecutive MAC management messages 200 have incremental values for a transaction ID 212. Advantageously, the transaction ID 212 can be used to avoid processing duplicated MAC management messages 200. If a device 102, 103, 104, 105 receives two or more MAC management messages 200 having the same transaction ID 212, the device 102, 103, 104, 105, can process one of the two or more MAC management messages 200, and ignore the rest of the MAC management messages 200. In an example, the transaction ID 212 can be included in the payload portion 209 of the fragment 204. In another example, the transaction ID 212 can be included in the header portion 207 of the fragment 204. Although in the example illustrated in FIG. 2, the transaction ID 212 is shown in the second fragment 204, in other examples, the transaction ID 212 can be in the first fragment 202, any other fragment (when more than two fragments), both (or all if more than two) fragments 202, 204, or a subset of the fragments.

Figure 3:
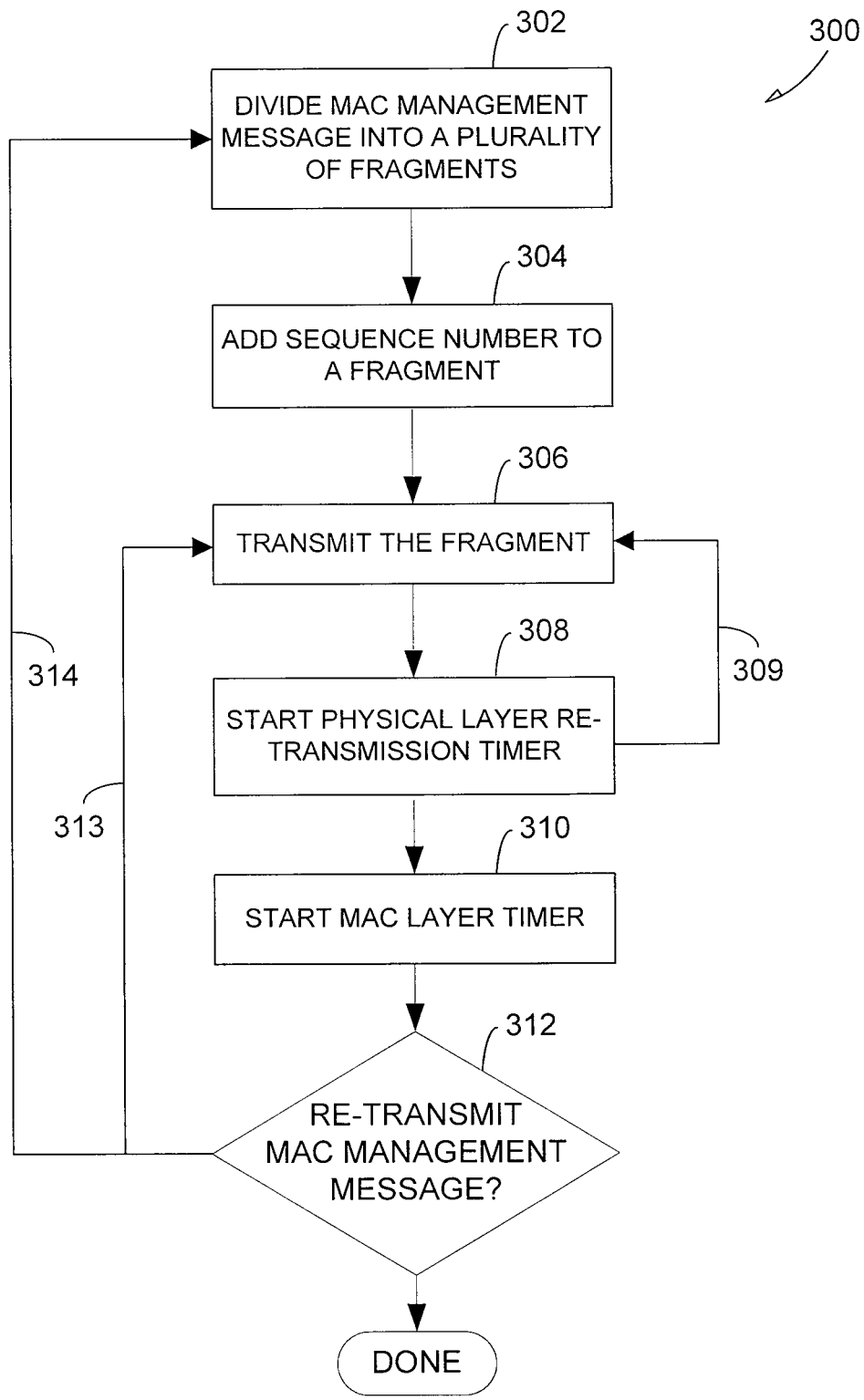
FIG. 3 illustrates an example of a method for transmitting a MAC management message in a plurality of fragments.

FIG. 3 illustrates an example of a method 300 for transmitting a MAC management message 200 from a device (e.g., a mobile station 102, 103 or a base station 104, 105). At block 302, the MAC management message 200 to be transmitted can be divided into a plurality of fragments 202, 204. In an example, the number of fragments used for a given MAC management message 200 is based on the size (e.g., number of bits) of the MAC management message 200. For example, larger MAC management messages 200 can be divided into a larger number of fragments 202, 204. Accordingly, the size of each fragment 202, 204 can be kept small.

At block 304, a sequence number 210 can be added to a first fragment 202. In an example, when the first fragment 202 is a first-in-order fragment relative to the MAC management message 200, the sequence number 210 can be arbitrary.

At block 306, the first fragment 202 can be transmitted. At block 308, a physical layer re-transmission timer is started by the physical layer of the transmitting device (e.g., mobile station 102, 103 or base station 104, 105) to determine when to re-transmit the first fragment 202. In an example, when a physical layer acknowledgement response (ACK) with respect to the first fragment 202 is not received from the reception device (e.g., mobile station 102, 103 or base station 104, 105) within a given time period, the physical layer of the transmitting device re-transmits the first fragment 202 as shown by line 309. For example, when a physical layer ACK is not received within 3 msec, the physical layer of the transmitting device re-transmits the first fragment 202. In an example, upon re-transmitting the first fragment 202, the physical layer timer can be re-started to determine when/if to re-transmit the first fragment 202 again. In an example, the physical layer can continue to time and re-transmit the first fragment 202 up to a maximum retry count or until a MAC layer timer exceeds a threshold time. In an example, once the physical layer has reached the maximum retry count and does not receive a physical layer ACK within the given (threshold) time period, the physical layer sends a local NACK to the MAC layer. The MAC layer can then initiate retransmission based on this local NACK as described below.

Blocks 304, 306, and 308 are repeated for each fragment 202, 204 of the MAC management message 200 to be transmitted. Accordingly, for the second fragment 204, a sequence number 211 is added at block 304. The sequence number 211 can indicate that the second packet 204 is adjacent to and following-in-order the first packet 202. In an example, the sequence number 211 can be one number incrementally higher than the sequence number 210 for the first packet 202. The second packet 204 can then be transmitted at block 306 and a second physical layer timer can be started for the second packet 204 at block 308. The second physical layer timer can be used in a manner similar to that described above with respect to the physical layer timer for the first packet 202. In an example, one or more of the fragments 202, 204 have a transaction ID added corresponding to the MAC management message 200. Although each fragment 202, 204 is described as being processed serially with respect to other fragments, in other examples, each fragment can be processed (e.g., blocks 304, 306, and 310) in parallel such that, for example, the sequence numbers can be added to one or more blocks (304), and then the one or more blocks can be transmitted (306).

In an example, different fragments 202, 204 can be transmitted over different channels. For example, a first fragment 202 can be transmitted over a first channel, and a second fragment 204 can be transmitted over a second channel. In an example, the one or more fragments 202, 204 are transmitted over one or more HARQ channels (ACID).

In an example, a MAC layer timer is used in addition to the physical layer timer. At block 310, the MAC layer timer is started based on transmission of a packet of the MAC management message 200 including a request for the receiving device to send a MAC layer ACK to determine the status of the MAC management message 200. In an example, the request for the receiving device to send a MAC layer ACK can be indicated by setting a polling bit to 1 at the transmitting device. In an example, a last pending fragment of the MAC management message 200 to be transmitted can include the request for the receiving device to send a MAC layer ACK. In an example, the MAC layer timer is started immediately after a fragment having the request therein is transmitted, for example the first fragment 202. In other examples, the request for the receiving device to send a MAC layer ACK can be included other packets or multiple packets from the MAC management message 200. In an example, the MAC layer timer is stopped when a MAC layer ACK or NACK message is received from the receiver. In an example, the MAC layer timer is stopped when a local NACK is received from the physical layer.

In an example, the MAC layer timer is used on a per message basis. Accordingly, each MAC management message 200 transmitted has a corresponding MAC layer timer. As mentioned above, in an example, the MAC layer determines to re-transmit based on reception of a MAC layer ACK. In an example, a MAC layer ACK is sent by a receiving device on a per message basis. Accordingly, the receiving device sends one MAC layer ACK for each MAC management message 200, or a portion thereof, received.

At block 312, the MAC layer determines whether to re-transmit the MAC management message 200 or a portion thereof. In an example, the MAC layer determines to re-transmit the MAC management message 200, or a portion thereof, based on a length of time on the MAC layer timer. That is, the MAC layer can determine to re-transmit when the MAC layer timer exceeds a threshold without receiving a MAC layer ACK. The MAC layer timer is used to account for situations when, for example, repeated attempts of packet re-transmission by the physical layer have failed or when the physical layer has received a false ACK. A false ACK can be received when a NACK is transmitted, but due to, for example, noise on the channel, the receiver of the NACK decodes an ACK instead.

In addition, the MAC layer can determine to re-transmit prior to expiration of the MAC layer timer based on whether a MAC layer NACK has been received from the receiving device. That is, when a MAC layer NACK is received, the MAC layer can determine to re-transmit regardless of the amount of time on the MAC layer timer. The MAC layer can also determine to re-transmit prior to expiration of the MAC layer timer based on whether a local NACK is received from the physical layer of the transmitting device. That is, when a local NACK is received, the MAC layer can determine to re-transmit regardless of the amount of time on the MAC layer timer.

Figure 4:
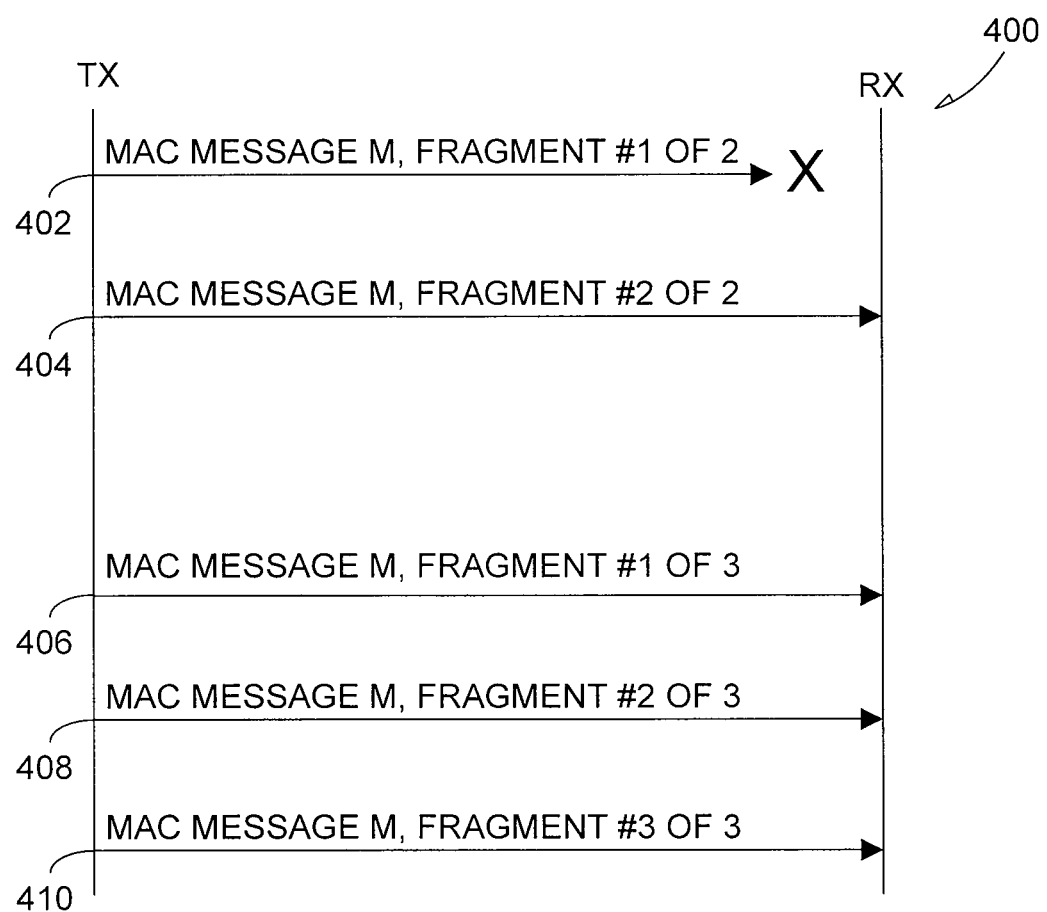
FIG. 4 illustrates an example of a signal flow for transmission and re-transmission of a MAC management message based on a MAC layer timer.

FIG. 4 illustrates an example of a signal flow 400 of transmission and re-transmission of a MAC management message 200 based on a MAC layer timer. At 402, a first fragment 202 of the MAC management message 200 is transmitted, and a MAC layer timer is started. At 404, a second fragment 204 of the MAC management message 200 is transmitted. In an example, the first fragment 202 includes a request for the receiving device to send a MAC layer ACK. After a threshold amount of time (based on a MAC layer timer) from transmission of the first fragment 202 without receiving a MAC layer ACK, the MAC layer of the transmitting device determines (block 312) to re-transmit the MAC management message 200. In an example, the given period of time is 15 msec. In an example, the given period of time is greater than the maximum round-trip re-transmission latency by the physical layer for the fragments 202, 204 of the MAC management message 200. In an example, the maximum round-trip re-transmission latency includes the length of time for the physical layer to re-transmit a fragment and wait multiple times until the maximum retry count is reached. In another example, the given period of time provides enough time for the physical layer to perform transmission and re-transmission at least once and receive a response from the transmission and re-transmission.

In an example, the MAC management message 200 is re-transmitted in its entirety by re-transmitting the first and second packets 202, 204. For example, as shown by line 313 in FIG. 3, blocks 306, 308, and 310 can be re-performed with respect to the MAC management message 200. Accordingly, the fragments transmitted can include the sequence numbers corresponding to the original fragments and a request for the receiving device to send a MAC layer ACK.

In an alternative example illustrated in FIG. 4, the MAC management message 200 is re-transmitted in its entirety by re-dividing the MAC management message 200 into new fragments and re-transmitting the new fragments. Accordingly, as shown by line 314 in FIG. 3, blocks 302, 304, 306, 308, and 310 can be re-performed. In an example, the MAC management message 200 can be divided into a larger number of fragments when it is re-divided in order to decrease the size of each fragment. This can potentially increase the likelihood of the fragments being successfully received at the receiving device. In the example shown in FIG. 4, the MAC management message 200 is re-divided into three new fragments. Each of the new fragments is given a sequence number at block 304, and one or more fragments can include a request to send a MAC layer ACK. At 406, 408, and 410 each of the new fragments are transmitted.

Figure 5:
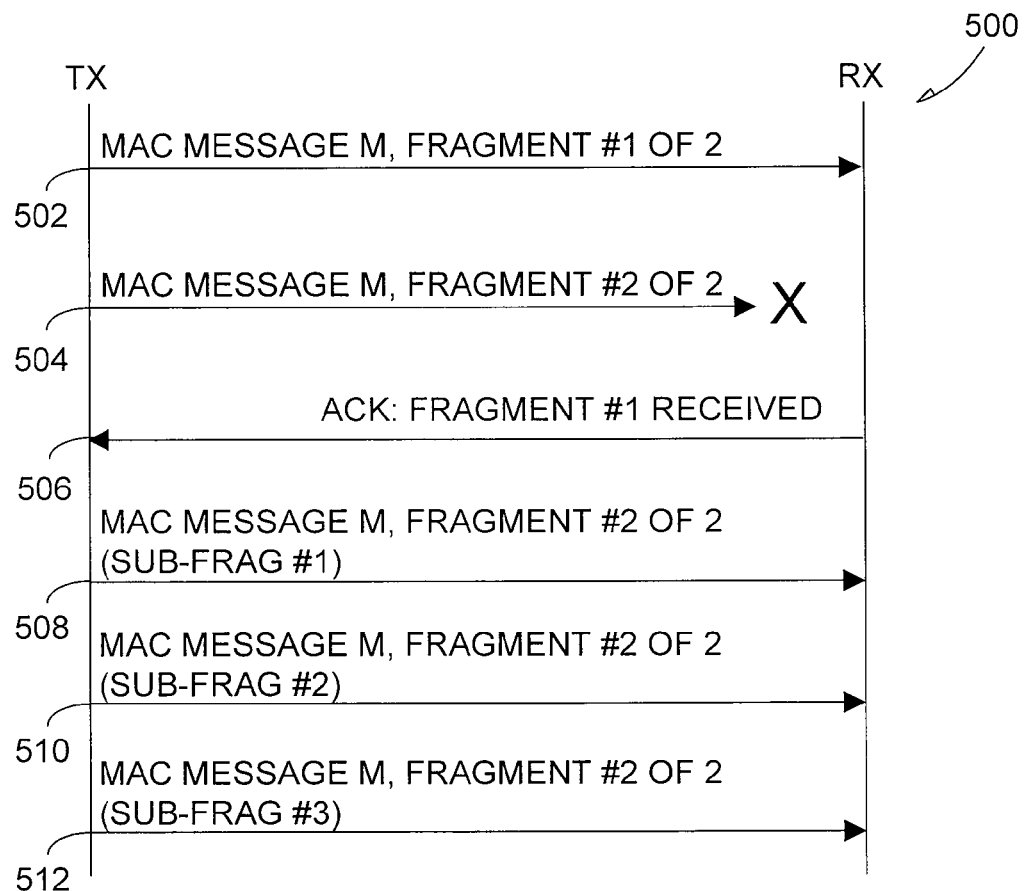
FIG. 5 illustrates another example of a signal flow for transmission of a MAC management message and re-transmission of a portion of the MAC management message.

FIG. 5 illustrates another example of a signal flow 500 for transmission and re-transmission of a MAC management message 200 based on a MAC layer ACK or NACK received. At 502, a first fragment 202 of the MAC management message 200 is transmitted from a transmitting device. At 504, a second fragment 204 of the MAC management message 200 is transmitted.

In an example, at 506, a MAC layer accumulative ACK is sent from the receiving device based on the fragments successfully received at the receiving device. An accumulative ACK indicates the consecutive fragments (e.g., starting with from a first fragment) that are successfully received at the receiving device. For example, when the first-in-order, second-in-order, third-in-order, and fifth-in-order fragments of a MAC management message are successfully received, but a fourth-in-order fragment is unsuccessfully received, an accumulative ACK would indicate that the first-in-order through the third-in-order fragments were successfully received. Based on this accumulative ACK, the transmitting device can then determine that any fragments after the third-in-order fragment may not have been successfully received.

In an example, the receiving device sends an accumulative ACK to the transmitting device after a threshold amount of time passes (based on a MAC layer reception timer) from receiving the first packet 202 without receiving a packet indicating that it is the last-in-order packet of the MAC management message 200, and all packets between the last-in-order packet and the first packet 202. In an example, the MAC layer reception timer is started upon successfully receiving the first fragment 202. In the example of FIG. 5, the second fragment 204 indicates that it is the last-in-order packet of the MAC management message 200. Accordingly, when the receiving device does not successfully receive the second fragment 204 within the threshold amount of time from receiving the first fragment 202, the receiving device sends an accumulative ACK. As shown in FIG. 5, this accumulative ACK acknowledges successful reception of the first fragment 202. When the transmitting device receives this accumulative ACK, the transmitting device determines that the second-in-order fragment (the second fragment 204) and any later-in-order fragments (none in this example) were not successfully received.

In another example, at 506, a MAC layer selective ACK is sent to the transmitting device. A selective ACK indicates each of the fragments of a message that are successfully received regardless of whether the fragments are consecutive or not. For example, when the first-in-order, second-in-order, third-in-order, and fifth-in-order fragments of a MAC management message are successfully received, but a fourth-in-order fragment is unsuccessfully received, the selective ACK can indicate that the first-in-order, second-in-order, third-in-order, and fifth-in-order fragment were successfully received. Based on this selective ACK, the transmitting device can determine precisely which fragments have been successfully received and which fragments were unsuccessfully received.

In an example, the receiving device sends a selective ACK to the transmitting device after a threshold amount of time passes (based on a MAC layer reception timer) from receiving the first packet 202 without receiving the last-in-order packet of the MAC management message 200 and all packets between the last-in-order packet and the first packet 202. In an example, the MAC layer reception timer is started upon successfully receiving the first fragment 202. In the example of FIG. 5, the second fragment 204 indicates that it is the last-in-order packet of the MAC management message 200. Accordingly, when the receiving device does not successfully receive the second fragment 204 within the threshold amount of time from receiving the first fragment 202, the receiving device sends a selective ACK. As shown in FIG. 5, this selective ACK acknowledges successful reception of the first fragment 202. When the transmitting device receives this selective ACK, the transmitting device determines that the second fragment 204 was not successfully received.

In yet another example, the receiving device can send a MAC layer selective NACK. A selective NACK indicates each of the fragments of a message that are unsuccessfully received regardless of whether the fragments are consecutive or not. The transmitting device can use this to determine which fragments are unsuccessfully received similar to that describe above with respect to the selective ACK.

Regardless of the type of MAC layer ACK or NACK received at the transmitting device, when the transmitting device determines that one or more fragments were not successfully received, the transmitting device can determine to re-transmit the MAC management message 200 in its entirety, or a portion thereof.

In the example shown in FIG. 5, the transmitting device re-transmits the portion of the MAC management message corresponding to the unsuccessfully received portion. As shown in FIG. 5, therefore, the transmitting device determines to re-transmit the second fragment 204 based on the ACK received. In the example shown in FIG. 5, the transmitting device re-transmits the second fragment 204 by splitting the second fragment into multiple sub-fragments and transmitting each sub-fragment individually. At 508, 510, and 512, the second fragment 204 is split into three sub-fragments and each sub-fragment is transmitted. In an example, each sub-fragment can include a sub-fragment sequence number for proper ordering of the sub-fragments to form a corresponding fragment. In another example, the transmitting device can simply re-transmit the (unchanged) second fragment 204. In an example, the fragment(s) or sub-fragments re-transmitted include the sequence numbers 210, 211 corresponding to the original fragment(s) such that the receiving device can properly order the fragment(s). Furthermore, the fragment(s) or sub-fragments re-transmitted can include a request for the receiving device to send a MAC layer ACK.

In another example, the MAC management message 200 can be re-transmitted in it entirety. As mentioned above, the MAC management message 200 can either be simply re-transmitted having the same fragments or the MAC management message can be re-divided and re-transmitted having a different number of fragments.

In an example, when the receiving device successfully receives a last-in-order fragment and all the fragments between the last-in-order fragment and the first-in-order fragment, the receiving device sends an ACK indicating that all fragments of the MAC management message 200 has been successfully received. Thus, no re-transmission is necessary.

Figure 6:
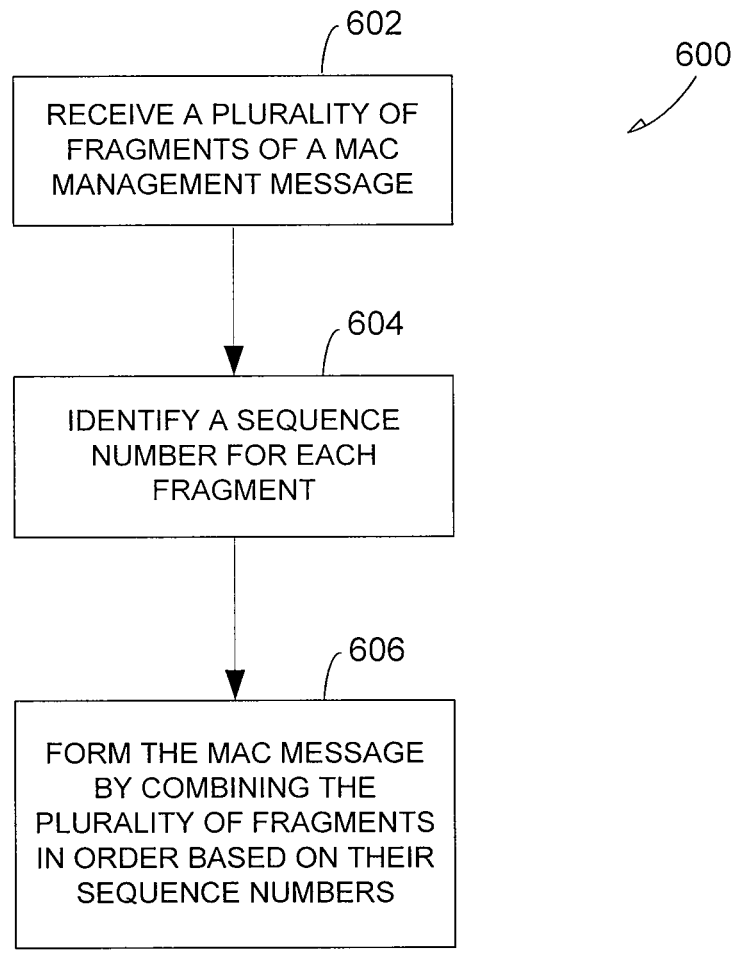
FIG. 6 illustrates an example of a method for receiving a plurality of fragments and forming a MAC management message from the plurality of fragments.

FIG. 6 illustrates an example of a method 600 for receiving a plurality of fragments and forming a MAC management message 200 from the plurality of fragments. At 602, a plurality of fragments is received at a receiving device. At 604, a sequence number is identified in each of the plurality of fragments. At 606, a MAC management message 200 is formed by combining the fragments based on their sequence number. As discussed above, the sequence number indicates the relative order of the fragments. Accordingly, the receiving device can combine the fragments in the proper order based on the sequence number.

Embodiments may be implemented in one or a combination of hardware, firmware and software. Embodiments may also be implemented as instructions stored on a computer-readable medium, which may be read and executed by at least one processing circuitry to perform the operations described herein. A computer-readable medium may include any mechanism for storing in a form readable by a machine (e.g., a computer). For example, a computer-readable medium may include read-only memory (ROM), random-access memory (RAM), magnetic disk storage media, optical storage media, flash-memory devices, and other storage devices and media.

EXAMPLE EMBODIMENTS

Example 1 includes a method for wireless communication performed by a mobile station. The method includes transmitting a first fragment of a MAC management message, transmitting a second fragment of the MAC management message, and transmitting a third fragment of the MAC management message. Each of the first, second, and third fragments include a sequence number indicating an order of the fragments. At least one of the first, second, and third fragments includes a transaction ID identifying the MAC management message with respect to other messages.

In Example 2, the subject matter of Example 1 can optionally include starting a single MAC layer timer when the first fragment is transmitted, such that no other MAC layer times are used for determining when to retransmit. Re-transmitting at least a portion of the MAC management message single MAC layer timer exceeds a threshold time, wherein the threshold time exceeds a threshold time for a physical layer timer.

In Example 3, the subject matter of any one of Examples 1-2 can optionally include dividing the MAC management message into the first, second, and third fragments, and re-transmitting the MAC management message in its entirety by re-dividing the MAC management message into more than three fragments and re-transmitting the more than three fragments.

In Example 4, the subject matter of any one of Examples 1-3 can optionally include receiving an accumulative ACK indicating that the first and second fragments were successfully received, and re-transmitting the MAC management message in its entirety.

In Example 5, the subject matter of any one of Examples 1-4 can optionally include assigning the sequence numbers on a per-message basis.

In Example 6, the subject matter of any one of Examples 1-5 can optionally include receiving a selective ACK indicating successful reception of the first and third fragment, and re-transmitting a portion of the MAC management message corresponding to the second fragment.

In Example 7, the subject matter of any one of Examples 1-6 can optionally includes re-transmitting the portion of the MAC management message corresponding to the second fragment in multiple sub-fragments.

In Example 8, the subject matter of any one of Examples 1-7 can optionally include transmitting the first, second, and third fragments in separate physical layer bursts.

Example 9 includes a wireless device including at least one processor configure to transmit a first fragment of a MAC management message, transmit a second fragment of the MAC management message, and transmit a third fragment of the MAC management message. Each of the first, second, and third fragments includes a sequence number indicating the order of the fragments. At least one of the first, second, and third fragments includes a transaction ID identifying the MAC management message with respect to other messages.

In Example 10, the subject matter of Example 9 can optionally include the at least one processor configured to start a single MAC layer timer when the first fragment is transmitted, such that no other MAC layer timers are used for determining when to re-transmit, and re-transmit at least a portion of the MAC management message when the single MAC layer timer exceeds a threshold time, wherein the threshold time exceeds a threshold time for a physical layer timer.

In Example 11, the subject matter of any one of Examples 9-10 can optionally include the at least one processor configured to divide the MAC management message into the first, second, and third fragments, and re-transmit the MAC management message in its entirety by re-dividing the MAC management message into more than three fragments and re-transmitting the more than three fragments.

In Example 12, the subject matter of any one of Examples 9-11 can optionally include the at least one processor configured to receive an accumulative ACK indicating that the first and second fragments were successfully received, and re-transmit the MAC management message in its entirety.

In Example 13, the subject matter of any one of Examples 9-12 can optionally include the at least one processor configured to assign the sequence numbers on a per-message basis.

In Example 14, the subject matter of any one of Examples 9-13 can optionally include the at least one processor configured to receive a selective ACK indicating successful reception of the first and third fragments, and re-transmit a portion of the MAC management message corresponding to the second fragment.

In Example 15, the subject matter of any one of Examples 9-14 can optionally include the at least one processor configured to re-transmit the portion of the MAC management message corresponding to the second fragment in multiple sub-fragments.

In Example 16, the subject matter of any one of Examples 9-15 can optionally include the at least one processor configured to transmit the first, second, and third fragments in separate physical layer bursts.

Example 17 includes a method for wireless communication performed by a mobile station. The method includes successfully receiving a first-in-order fragment of a first MAC management message. The method also includes starting a single reception timer when the first-in-order fragment is received, such that no other MAC layer reception timers are used to determine when to send an ACK. After a threshold amount of time on the single reception timer without successfully receiving a last-in-order fragment of the first MAC management message and each fragment between the last-in-order fragment and the first fragment of the first MAC management message, sending an accumulative ACK indicating successful reception of the first-in-order fragment and each consecutive fragment successfully received.

In Example 18, the subject matter of Example 17 can optionally include successfully receiving a first fragment of a second MAC management message. A single reception timer is started when the first fragment of the second MAC management message is received, such that no other MAC layer reception timers are used to determine when to send an ACK. After a threshold amount of time on the single reception timer without successfully receiving a last-in-order fragment of the second MAC management message and each fragment between the last-in-order fragment and the first fragment of the second MAC management message, sending a selective ACK indicating successful reception of each of the fragments successfully received.

Example 19 includes a wireless device comprising at least one processor configured to successfully receive a first-in-order fragment of a first MAC management message. The at least one processor is also configured to start a single reception timer when the first-in-order fragment is received, such that no other MAC layer reception timers are used to determine when to send an ACK. After a threshold amount of time on the single reception timer without successfully receiving a last-in-order fragment of the first MAC management message and each fragment between the last-in-order fragment and the first fragment of the first MAC management message, the at least one processor is configured to send an accumulative ACK indicating successful reception of the first-in-order fragment and each consecutive fragment successfully received.

In Example 20, the subject matter of Example 19 can optionally include the at least one processor configured to successfully receive a first fragment of a second MAC management message and start a single reception timer when the first fragment of the second MAC management message is received, such that no other MAC layer reception timers are used to determine when to send an ACK. After a threshold amount of time on the single reception timer without successfully receiving a last-in-order fragment of the second MAC management message and each fragment between the last-in-order fragment and the first fragment of the second MAC management message, the at least one processor is configured to send a selective ACK indicating successful reception of each of the fragments successfully received.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for wireless communication performed by a mobile station, the method comprising:
   fragmenting a MAC management message into a plurality of fragments;
   transmitting the plurality of fragments, each fragment including a header which includes a sequence number indicating an order of the fragments and wherein at least one of the fragments includes a transaction ID identifying the MAC management message with respect to other MAC management messages;
   determining that one of the plurality of fragments needs to be retransmitted; and
   responsive to determining that one of the plurality of fragments needs to be retransmitted:
      fragmenting the one of the plurality of fragments into a plurality of sub-fragments; and
      retransmitting the one of the plurality of fragments that needs to be retransmitted by transmitting the plurality of subfragments.

2. The method of claim 1, comprising:
   starting a single MAC layer timer when a first fragment of the plurality of fragments is transmitted, the single MAC layer timer being the only MAC layer timer used for determining when to retransmit;
   wherein determining that one of the plurality of fragments needs to be retransmitted includes determining that the single MAC layer timer exceeds a threshold time, and wherein the threshold time exceeds a threshold time for a physical layer.

3. The method of claim 1, wherein further responsive to determining that one of the plurality of fragments needs to be retransmitted:
   fragmenting all of the plurality of fragments into a plurality of sub-fragments; and
   retransmitting the MAC management message by transmitting all of the plurality of sub-fragments.

4. The method of claim 1, wherein determining that one of the plurality of fragments needs to be retransmitted includes:
   receiving an accumulative ACK; and
   determining, based on the accumulative ACK that the one of the plurality of fragments was not successfully received.

5. The method of claim 1, comprising:
   assigning the sequence numbers on a per-message basis.

6. The method of claim 1, wherein determining that one of the plurality of fragments needs to be retransmitted includes:
   receiving a selective ACK; and
   determining, based upon the selective ACK that the one of the plurality of fragments was not successfully received.

7. The method of claim 1, wherein transmitting the plurality of fragments includes transmitting a first, second, and third fragment of the plurality of fragments in separate physical bursts.

8. A wireless device comprising:
   at least one processor configured to:
      fragment a MAC management message into a plurality of fragments;
      transmit the plurality of fragments, each fragment including a header which includes a sequence number indicating the order of the fragments, and wherein at least one of the headers of one of the fragments includes a transaction ID identifying the MAC management message with respect to other MAC management messages;
      determine that one of the plurality of fragments needs to be retransmitted; and
      responsive to a determination that the one of the plurality of fragments needs to be retransmitted:
         fragmenting the one of the plurality of fragments into a plurality of sub-fragments; and
         retransmitting the one of the plurality of fragments that needs to be retransmitted by transmitting the plurality of subfragments.

9. The wireless device of claim 8, wherein the at least one processor is configured to:
   start a single MAC layer timer when a first fragment of the plurality of fragments is transmitted, the single MAC layer timer being the only MAC layer timer used for determining when to retransmit;
   wherein the processor is configured to determine that one of the plurality of fragments needs to be retransmitted by at least being configured to determine that the single MAC layer timer exceeds a threshold time, wherein the threshold time exceeds a threshold time for a physical layer timer.

10. The wireless device of claim 9, wherein the at least one processor is configured to:
   responsive to determining that one of the plurality of fragments needs to be retransmitted:
      fragment all of the plurality of fragments into a plurality of sub-fragments; and
      retransmit the MAC management message by transmitting all of the plurality of sub-fragments.

11. The wireless device of claim 8, wherein the at least one processor is configured to determine that one of the plurality of fragments needs to be retransmitted by at least being configured to:
   receive an accumulative ACK; and
   determine, based on the accumulative ACK that the one of the plurality of fragments was not successfully received.

12. The wireless device of claim 8, wherein the at least one processor is configured to:
   assign the sequence numbers on a per-message basis.

13. The wireless device of claim 8, wherein the at least one processor is configured determine that one of the plurality of fragments needs to be retransmitted by at least being configured to:
   receive a selective ACK; and
   determine, based on the selective ACK that the one of the plurality of fragments was not successfully received.

14. The wireless device of claim 8, wherein the at least one processor is configured to:
   transmit a first, second, and third fragment of the plurality of fragments in separate physical bursts.

* * * * *

UNITED STATES PATENT AND TRADEMARK OFFICE
CERTIFICATE OF CORRECTION

| | | |
|---|---|---|
| PATENT NO. | : 8,755,408 B2 | Page 1 of 1 |
| APPLICATION NO. | : 12/766544 | |
| DATED | : June 17, 2014 | |
| INVENTOR(S) | : Venkatachalam et al. | |

It is certified that error appears in the above-identified patent and that said Letters Patent is hereby corrected as shown below:

In the Claims:

In column 11, line 67, in Claim 1, after "fragments", insert --,--, therefor

In column 12, line 12, in Claim 1, delete "subfragments" and insert --sub-fragments--, therefor In column 12, line 65-66, in Claim 8, delete "subfragments" and insert --sub-fragments--, therefor Signed and Sealed this
Eighteenth Day of November, 2014

Michelle K. Lee
*Deputy Director of the United States Patent and Trademark Office*